US012614343B1

(12) United States Patent
Smith et al.

(10) Patent No.: US 12,614,343 B1
(45) Date of Patent: Apr. 28, 2026

(54) SYSTEMS AND METHODS FOR OPTIMIZED STREAMING OF THREE-DIMENSIONAL CONTENT BASED ON A PRE-CULLED SEGMENTATION OF THE THREE-DIMENSIONAL CONTENT

(71) Applicant: Miris, Inc., Culver City, CA (US)

(72) Inventors: Rodney David Smith, Draper, UT (US); Marko Jagodić, Zagreb (HR)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/381,496

(22) Filed: Nov. 6, 2025

(51) Int. Cl.
    *G06T 15/20* (2011.01)
    *G06T 9/00* (2006.01)
    *G06T 15/40* (2011.01)
(52) U.S. Cl.
    CPC .............. *G06T 15/20* (2013.01); *G06T 9/00* (2013.01); *G06T 15/40* (2013.01); *G06T 2210/36* (2013.01)
(58) Field of Classification Search
    CPC ........... G06T 15/20; G06T 9/00; G06T 15/40; G06T 2210/36
    See application file for complete search history.

(56) References Cited

U.S. PATENT DOCUMENTS 11,756,260 B1 * 9/2023 Ponce ....................... G06T 7/73
                                                            345/419

OTHER PUBLICATIONS

Naga K. Govindaraju, Avneesh Sud, Sung-Eui Yoon, and Dinesh Manocha. 2003. Interactive visibility culling in complex environments using occlusion-switches. In Proceedings of the 2003 symposium on Interactive 3D graphics (I3D '03). Association for Computing Machinery, New York, NY, USA, 103-112. (Year: 2003).*
Dorian Gomez, Pierre Poulin, Mathias Paulin. Occlusion Tiling. Graphics Interface, May 2011, St. Jonh's, Canada. pp. 71-78 (Year: 2011).*
Lining Yang and Roger Crawfis. 2003. A panoramic walkthrough system with occlusion culling. In Proceedings of the workshop on Virtual environments 2003 (EGVE '03). Association for Computing Machinery, New York, NY, USA, 169â177. https://doi.org/10.1145/769953.769973 (Year: 2003).*

* cited by examiner

*Primary Examiner* — Xiao M Wu
*Assistant Examiner* — Latrell Anthony Creary
(74) *Attorney, Agent, or Firm* — Ansari Katiraei LLP; Arman Katiraei; Sadiq Ansari

(57) ABSTRACT

A system and associated methods optimize the streaming of three-dimensional (3D) content based on a pre-culled segmentation of the 3D content. The pre-culled segmentation involves performing server-side occlusion culling or preprocessing of the 3D content so that only the visible primitives within a requested field-of-view are streamed to client devices rather than all primitives within the requested field-of-view. The system segments the 3D content primitives to different tiles and filters each tile to differentiate a first subset of visible primitives in each tile from a second subset of non-visible primitives in each tile. The system receives a request for the 3D content, retrieves the one or more tiles with primitives positioned within the requested field-of-view, and streams the first subset of visible primitives from each tile of the one or more tiles in response to the request without the second subset of non-visible primitives.

18 Claims, 8 Drawing Sheets

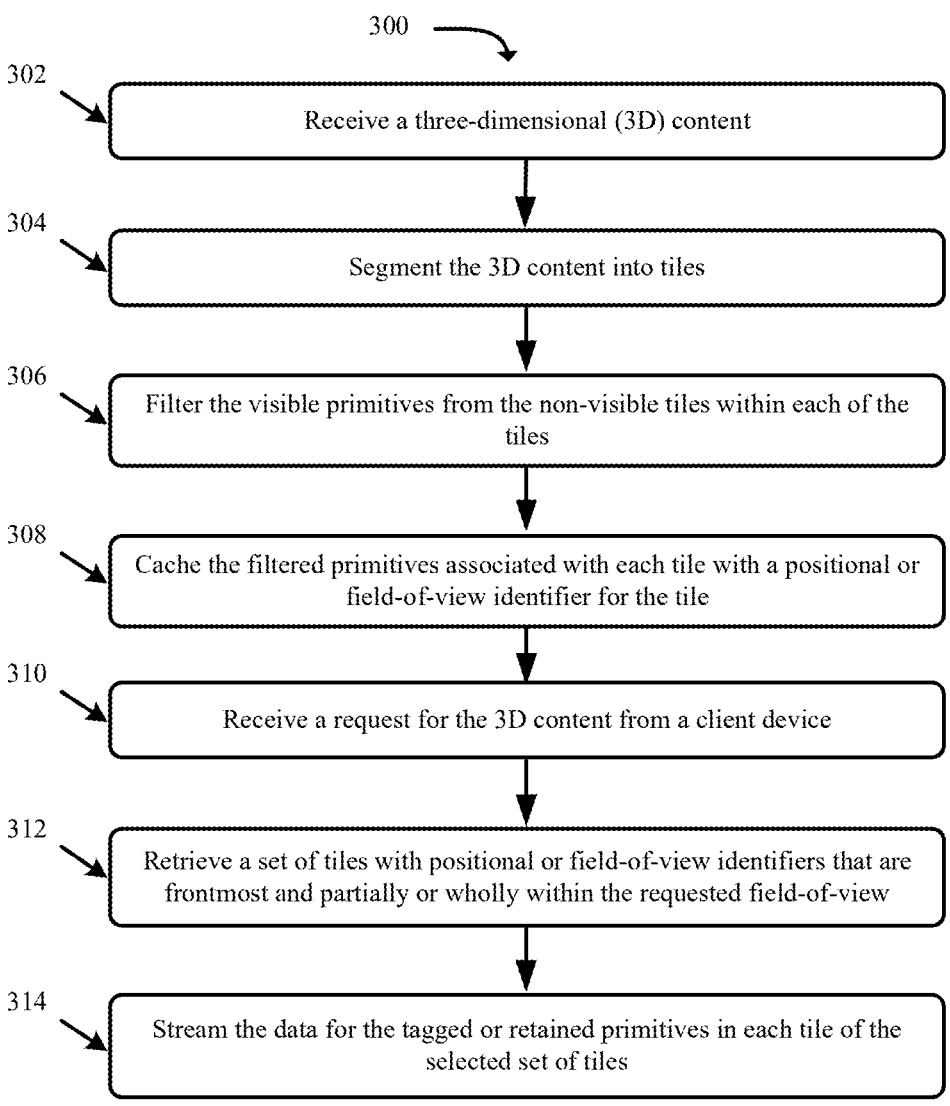

300

302 — Receive a three-dimensional (3D) content

304 — Segment the 3D content into tiles

306 — Filter the visible primitives from the non-visible tiles within each of the tiles 308 — Cache the filtered primitives associated with each tile with a positional or field-of-view identifier for the tile 310 — Receive a request for the 3D content from a client device 312 — Retrieve a set of tiles with positional or field-of-view identifiers that are frontmost and partially or wholly within the requested field-of-view 314 — Stream the data for the tagged or retained primitives in each tile of the selected set of tiles

FIG. 3

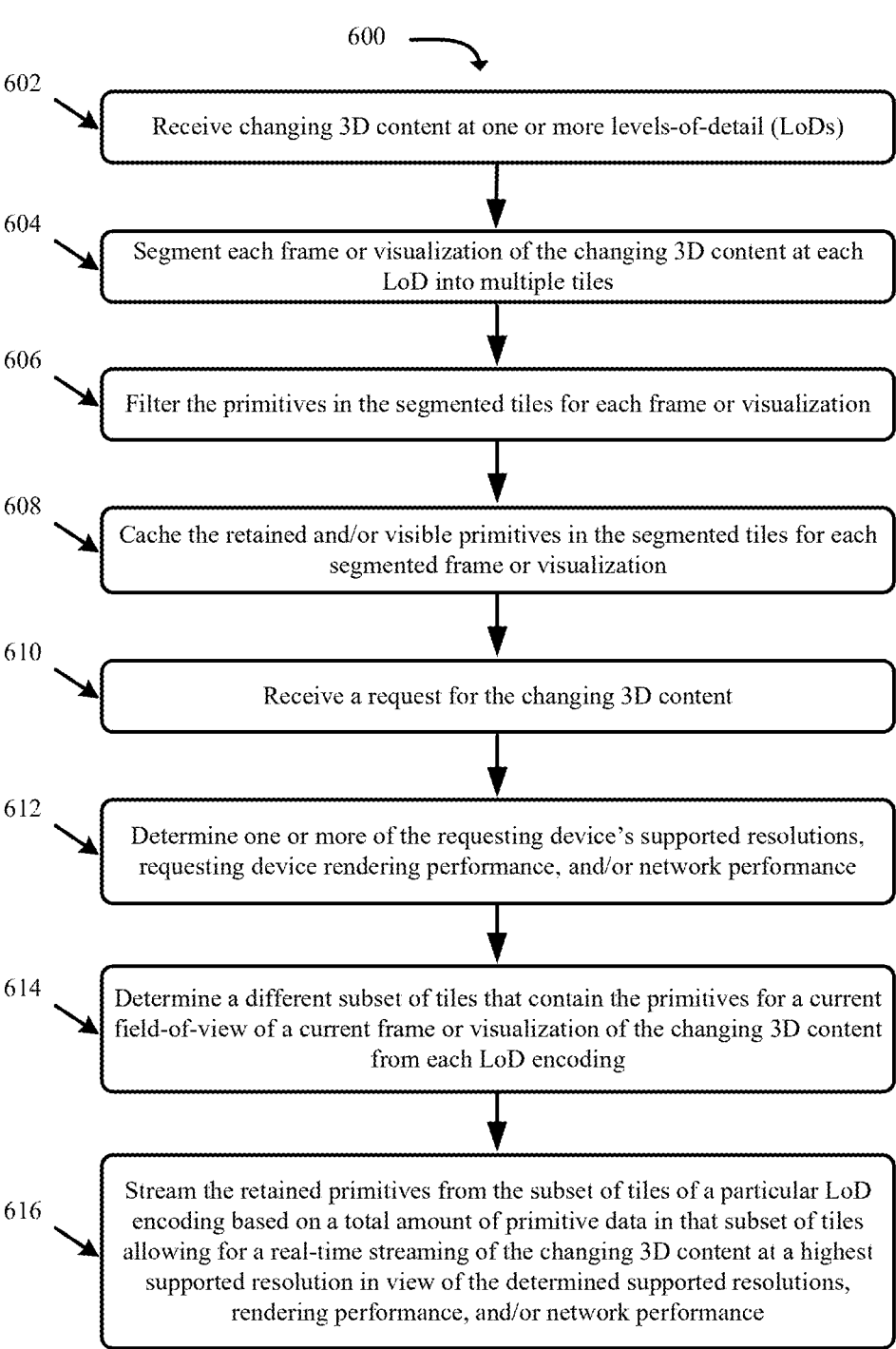

600

602
Receive changing 3D content at one or more levels-of-detail (LoDs)

604
Segment each frame or visualization of the changing 3D content at each LoD into multiple tiles 606
Filter the primitives in the segmented tiles for each frame or visualization 608
Cache the retained and/or visible primitives in the segmented tiles for each segmented frame or visualization 610
Receive a request for the changing 3D content 612
Determine one or more of the requesting device's supported resolutions, requesting device rendering performance, and/or network performance 614
Determine a different subset of tiles that contain the primitives for a current field-of-view of a current frame or visualization of the changing 3D content from each LoD encoding 616
Stream the retained primitives from the subset of tiles of a particular LoD encoding based on a total amount of primitive data in that subset of tiles allowing for a real-time streaming of the changing 3D content at a highest supported resolution in view of the determined supported resolutions, rendering performance, and/or network performance

SYSTEMS AND METHODS FOR OPTIMIZED STREAMING OF THREE-DIMENSIONAL CONTENT BASED ON A PRE-CULLED SEGMENTATION OF THE THREE-DIMENSIONAL CONTENT

BACKGROUND

Three-dimensional (3D) content streaming is challenging because of the amount of data that is transferred to generate each frame or visualization of the 3D content. 3D content streaming content typically involves streaming all the primitives of the 3D content so that the 3D content may be presented from any of multiple different views or from a 360-degree visualization. Conversely, streaming two-dimensional (2D) content involves streaming data to present the 2D content from a single view. As such, the streamed 3D content may have orders of magnitude more data than streamed 2D content resulting in several seconds of buffering before the primitives for rendering a first frame or visualization are received by a client device. The streamed 3D content imposes significant processing and rendering overhead on the client device. For instance, the client device performs occlusion culling on the received 3D content primitives to determine which of the primitives are visible and should be rendered and which should be omitted. Accordingly, there is a need to reduce the amount of data that is streamed for a real-time 3D streaming experience.

BRIEF DESCRIPTION OF THE DRAWINGS

FIG. 3 presents a process for the optimized 3D content streaming based on the pre-culled segmentation of the 3D content in accordance with some embodiments presented herein.

FIG. 6 presents a process for applying the pre-culled segmentation to optimize the streaming of changing 3D content in accordance with some embodiments presented herein.

DETAILED DESCRIPTION OF PREFERRED EMBODIMENTS

Figure 1:
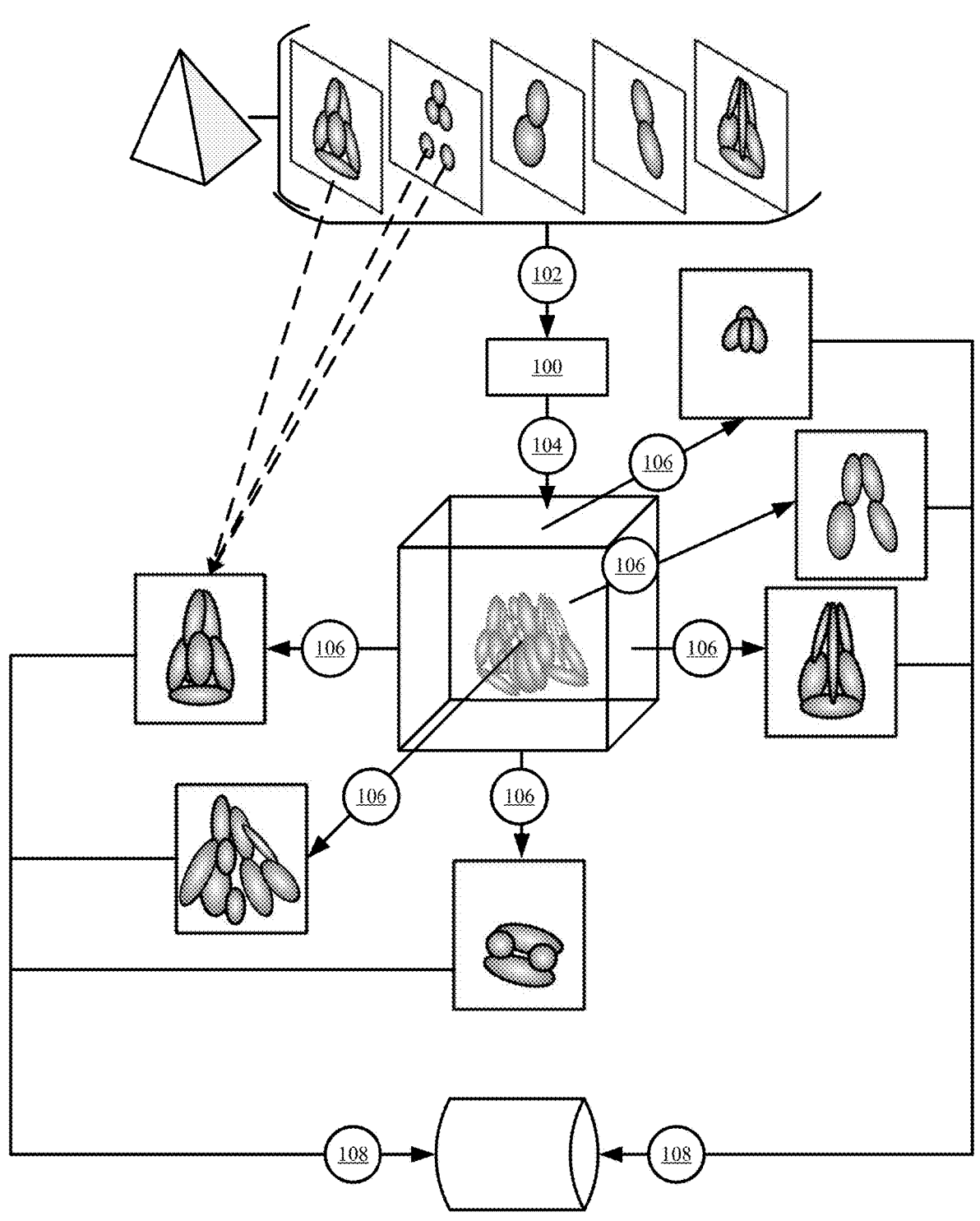
FIG. 1 illustrates an example of the pre-culled segmentation of three-dimensional (3D) content in accordance with some embodiments presented herein.

The following detailed description refers to the accompanying drawings. The same reference numbers in different drawings may identify the same or similar elements.

Provided are systems and associated methods for optimized streaming of three-dimensional (3D) content based on a pre-culled segmentation of the 3D content. The pre-culled segmentation includes dividing the 3D content into partially overlapping tiles. A 3D streaming system may pre-process or pre-render the 3D content primitives within each tile to perform occlusion culling and remove the primitives that are not visible from the two-dimensional (2D) plane of each tile. The pre-processing or pre-rendering may include filtering the primitives within a tile to retain the subset of primitives that are visible from the tile, thereby creating a 2D representation or single view representation for the sub-region of the 3D content that is spanned by the tile. The 3D streaming system caches or stores the culled tiles for distribution in response to a request for the 3D content. In some embodiments, the 3D streaming system may receive a request from a client device to view the 3D content from a particular field-of-view and the request may specify which culled tiles are within the requested field-of-view. In some other embodiments, the 3D streaming system determines which tiles are within the requested field-of-view. The 3D streaming system streams the visible subset of primitives retained as part of the culled tiles within the requested field-of-view.

Streaming the visible subset of primitives includes streaming only the data that the client device needs to render the requested field-of-view without extraneous data for other views, for primitives outside the requested field-of-view, or for primitives insides the requested field-of-view that are not visible and would otherwise be culled in the rendering pipeline of the client device if not for the pre-processing and culling performed by 3D streaming system 100 prior to streaming the visible subset of primitives. As such, the 3D streaming system optimizes the streaming of the 3D content by reducing the streamed data for the 3D content visualization to the equivalent amount of data needed for streaming 2D content. Moreover, streaming the visible subset of primitives also provides the client device with pre-culled primitives for the requested field-of-view so that the client device may directly render the requested field-of-view without the overhead associated with occlusion culling.

The 3D streaming system may maintain a real-time streaming experience by streaming different filtered subsets of visible primitives for different fields-of-view requested by the client device or for animated 3D content that has to be streamed and presented at a particular frame rate. In particular, rather than stream the entirety of the 3D content to a client device so that the client device may render the 3D content from whatever field-of-view is requested, the 3D streaming streams only the data for the visible or retained primitives in the pre-culled cached tiles forming the different fields-of-view as those different fields-of-view are requested.

The client device is able to generate a first visualization of the 3D content in much less time and with a fraction of the amount of streamed data than when the client device receives all of the 3D content primitives before processing those primitives to render the same first visualization. For instance, in response to the client device moving the position of a camera to view the 3D content from a different field-of-view, the 3D streaming system may select the tiles within the different field-of-view, and may stream the filtered subset of visible primitives associated with the selected tiles to the client device. The client device receives and renders the same 3D content primitives to visualize that different field-of-view but without the data for other primitives outside the field-of-view or occluded primitives that are inside the field-of-view and that the client device excludes when rendering the field-of-view. Similarly, for animated 3D content that changes at a particular frame rate, the 3D streaming system streams the changing filtered subset of visible primitives for the requested field-of-view at the particular frame rate rather than all primitives of the animated 3D content or all primitives including occluded primitives in the requested field-of-view at the particular rate.

FIG. 1 illustrates an example of the pre-culled segmentation of 3D content in accordance with some embodiments presented herein. 3D streaming system 100 receives (at 102) 3D content to optimize for streaming to different client devices over data networks with different performance to each client device. In some embodiments, the 3D content is defined as a 3D Gaussian Splat (3DGS) representation, a 4D Gaussian Spalt (4DGS) representation, or other splat representation with primitives corresponding to splats that are overlaid and/or distributed across a 3D space to represent one or more 3D objects or scenes. Each splat may be defined with (x,y,z) coordinates, a covariance matrix that stores a scaling value for the radius or shape of the splat, orientation or rotational information, and/or other shape or positional parameters of the splat, and/or spherical harmonics that represent some visual characteristics of the splat. In some embodiments, the 3D content is defined as a mesh model with primitives corresponding to a connected set of meshes or polygons that construct the 3D shape and visual characteristics of one or more 3D objects or scenes. Each mesh may be defined with coordinates for the mesh vertices and with visual characteristics for the color, opacity, reflectivity, and/or other visual properties of the mesh. In some embodiments, the 3D content is defined as a point cloud with primitives corresponding to a distributed and disconnected set of points that construct the 3D shape and visual characteristics of the one or more objects or scenes. Each point may be defined with a coordinate for a position in 3D space and with visual characteristics for the color, opacity, reflectivity, and/or other visual properties of the point. In some embodiments, the 3D content may be defined as implicit surfaces or with other 3D primitives that form or define 3D shapes.

3D streaming system 100 partitions (at 104) the 3D space of the 3D content into different quadrants or tiles. In some embodiments, the tiles represent a spherical segmentation of the 3D space around the 3D content. In some other embodiments, the tiles represents a grid-like segmentation of the 3D space around the 3D content. As shown in FIG. 1, the grid-like segmentation may include defining 6 tiles for the front, back, right, left, top, and bottom views of the 3D content. The size and number of tiles may vary depending on the complexity of the 3D content. For instance, fewer tiles that are larger in size may be defined for 3D content that has a low resolution and/or small data size and more tiles that are smaller in size may be defined for 3D content that has a high resolution and/or large data size.

3D streaming system 100 pre-processes (at 106) each of tiles. The tile pre-processing (at 106) includes performing occlusion culling. The occlusion culling includes filtering the primitives (e.g., splats, meshes, points, etc.) within the tile boundaries to retain the primitives that are visible and to discard, exclude, or otherwise cull the primitives that are not visible. In some embodiments, 3D streaming system 100 differentiates the visible primitives from the non-visible primitives based on their positional and/or visual characteristic definitions relative to the 2D plane of the tile. For instance, primitives that occupy the same region of space may be differentiated as visible and non-visible based on their z-depth position relative to the 2D plane of the tile and/or their transparency or opacity parameters. In some other embodiments, 3D streaming system 100 differentiates the visible primitives from the non-visible primitives by rendering the primitives in a tile and determining which primitives are visible in the rendered visualization. The tile pre-processing (at 106) may include tagging or indexing the retained visible primitives in each tile.

3D streaming system 100 caches (at 108) the culled tiles or the retained primitives associated with each culled tile with a positional or field-of-view identifier in a memory or a non-volatile storage. The positional identifier for a particular culled tile may correspond to the coordinates of the plane spanned by that particular culled tile in the 3D space of the 3D content. 3D streaming system 100 may stream the cached data for different sets of culled tiles that represent different fields-of-view for the 3D content in response to received requests for those different fields-of-view.

Figure 2:
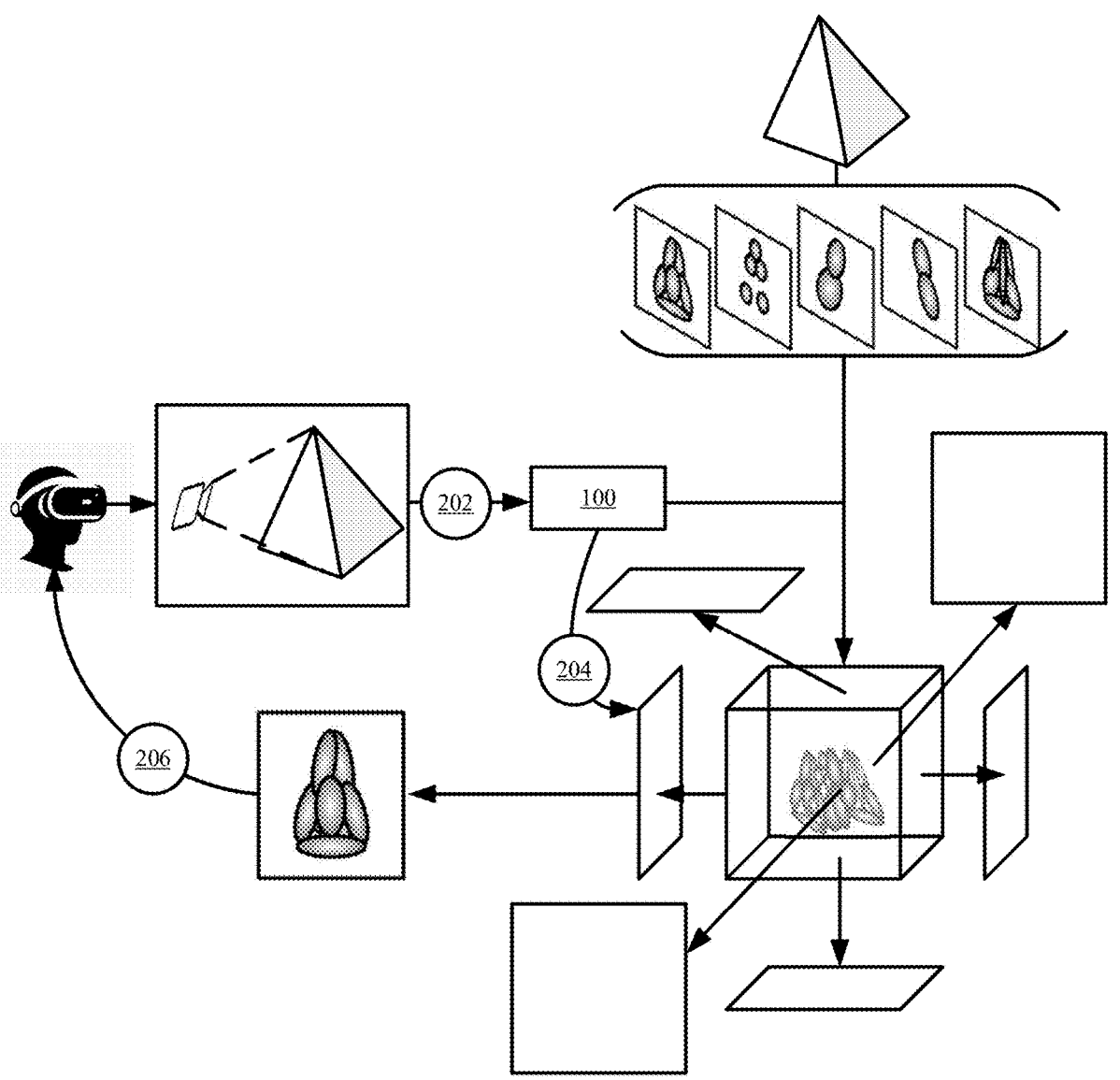
FIG. 2 illustrates an example of the optimized 3D content streaming based on the pre-culled segmentation of the 3D content in accordance with some embodiments presented herein.

FIG. 2 illustrates an example of the optimized 3D content streaming based on the pre-culled segmentation of the 3D content in accordance with some embodiments presented herein. 3D streaming system 100 receives (at 202) a request to view the 3D content from a particular field-of-view from a client device over a data network. In some embodiments, the request specifies a position and/or orientation for a virtual camera in the 3D space of the 3D content from which the particular field-of-view is determined. In some other embodiments, the request identifies the culled tiles that are within the particular field-of-view.

3D streaming system 100 selects (at 204) the one or more pre-culled tiles of the 3D content that occupy the same region of the 3D space as the particular field-of-view, that are directed towards the particular field-of-view, and/or that are not obscured or behind other tiles. In some embodiments, 3D streaming system 100 may analyze the coordinates associated with each tile to determine whether the tile is within the particular field-of-view and whether is obscured or behind other tiles. For instance, selecting (at 204) the one or more pre-culled tiles includes determining the coordinates for the frontmost plane of the particular field-of-view and retrieving the pre-culled tiles that were previously generated and cached for the 3D content and that have a positional identifier and/or coordinates partially or wholly within the coordinates for the frontmost plane of the particular field-of-view.

3D streaming system 100 streams (at 206) the retained primitives from each selected (at 204) pre-culled tile to the client device. By streaming (at 206) the retained primitives, 3D streaming system 100 does not consume bandwidth to stream primitives that are outside the particular field-of-view or that are obscured or occluded by other primitives in the particular field-of-view. The amount of data and bandwidth required to stream (at 206) the retained primitives is commensurate or about equal to the amount of data and bandwidth for streaming 2D content despite the streamed (at 206) primitives preserving the dimensionality and the detail of the 3D content.

The client device receives and renders the streamed (at 206) primitives to produce a 3D visualization. The rendering overhead for the client device is reduced because of the pre-processing or pre-rendering performed by 3D streaming system 100. For instance, the client device may omit the occlusion culling operations in the rendering pipeline since 3D streaming system 100 already performed those operations on the server-side. In some embodiments, the client device may still perform the occlusion culling operations as part of its rendering pipeline. Performing the occlusion culling operations at the client device adds minimal or no overhead to the rendering pipeline since the primitives were already culled by 3D streaming system 100 and because the culling performed by 3D streaming system 100 may reduce the number of primitives that the client device receives and analyzes for occlusion culling.

FIG. 3 presents a process 300 for the optimized 3D content streaming based on the pre-culled segmentation of the 3D content in accordance with some embodiments presented herein. Process 300 is implemented by 3D streaming system 100. 3D streaming system 100 may include one or more devices or machines with processor, memory, storage, network, and/or other hardware resources that are configured for 3D content streaming. For instance, 3D streaming system 100 may be part of a live or on-demand 3D content streaming service that different client devices access remotely over a data network. The 3D content hosted or streamed from 3D streaming system 100 may include static 3D models or environments, 3D videos, 3D animations, 3D games, spatial computing experiences (e.g., virtual reality, mixed reality, augmented reality, or other enhanced reality experiences), and/or other animated 3D content.

Process 300 includes receiving (at 302) 3D content for distribution to client devices. The 3D content may be uploaded to 3D streaming system 100 by one or more third-party content providers or may be generated by 3D streaming system 100 via 3D imaging or scanning. The 3D content may include content that is defined and/or encoded as a mesh model, point cloud, splat representation, or other 3D format.

Process 300 includes segmenting (at 304) the 3D content into tiles. The tiles may be defined as 2D rectangles or other 2D shapes that encompass or fully surround the 3D content. The tiles May collectively form a sphere-like shape that surrounds the 3D content or a grid-like partitioning of the 3D content. The segmentation may occur in the 3D space in which the 3D content is defined or directly on the 3D content itself. The size and number of tiles may vary based on the resolution and/or amount of data encoded as part of the 3D content.

Process 300 includes filtering (at 306) the primitives within each of the tiles. 3D streaming system 100 filters (at 306) the primitives to retain or tag the primitives that are visible in each tile and to exclude or leave untagged the primitives that are not visible in each tile. The visible and non-visible primitives may be differentiated based on their positional and/or visual characteristic values or by rendering the primitives to determine which primitives are visible and which are not. In particular, 3D streaming system 100 may define different virtual cameras with fields-of-view that align with the boundaries of the different segmented (at 304) tiles. Each virtual camera views a tile from the outside looking into the tile. The filtering (at 306) is part of a pre-processing or pre-rendering operation that 3D streaming system 100 performs. For instance, the pre-rendering operation may be part of the rendering pipeline used by 3D streaming system 100 and may include an occlusion culling step that differentiates the visible primitives from the non-visible primitives in the rendered tile. 3D streaming system 100 may reference the occlusion culling data to differentiate and/or filter (at 306) the visible primitives from the non-visible primitives.

Process 300 include caching (at 308) the filtered (at 306) primitives associated with each tile with a positional or field-of-view identifier for the tile. The pre-culled tiles are cached (at 308) in order to reuse the results of the 3D content segmentation (at 304) and filtering (at 306) to respond to different requests for the 3D content. In other words, 3D streaming system 100 pre-processes the 3D content to generate the culled tiles and stores the culled tiles in order to provide the visible primitives for different requested fields-of-view without having to segment (at 304) and filter (at 306) the primitives of the 3D content for each request.

Process 300 includes receiving (at 310) a request for the 3D content from a client device over a data network. In some embodiments, the client device determines a set of tiles with positional or field-of-view identifiers that are frontmost and partially or wholly within the requested field-of-view and requests the set of tiles directly from 3D streaming system 100. In some other embodiments, the request may specify a virtual camera position and orientation or a particular field-of-view at which to view the 3D content, and 3D streaming system 100 determines the set of tiles that are within the requested field-of-view based on the virtual camera position and orientation or the particular field-of-view parameters. Should the request not specify a virtual camera position and orientation or a field-of-view, 3D streaming system 100 may present the 3D content from a default or initial field-of-view. For instance, 3D streaming system 100 may present the 3D content from a front centered view when the request does not specify a field-of-view.

Process 300 includes retrieving (at 312) the set of tiles that are frontmost and partially or wholly within the requested field-of-view. The set of tiles include tiles that are not obscured by other tiles that may be closer to the virtual camera or the requested field-of-view or in-between the position of the tile and the foreground plane of the requested field-of-view. The set of tiles may also include tiles that are facing or directed towards the virtual camera or the foreground plane of the requested field-of-view. In some embodiments, the tiles are defined with surface normals to identify the direction that the tile is facing. 3D streaming system 100 may identify the coordinates for the foreground plane of the requested field-of-view and may select (at 312) any tiles that are within and closest to the foreground plane.

Process 300 includes streaming (at 314) the data for the tagged or retained primitives in each tile of the selected (at 312) set of tiles. 3D streaming system 100 significantly reduces the total amount of data that is streamed (at 314) to generate a visualization of the 3D content by not streaming the primitives that are outside the requested field-of-view and by not streaming the primitives that are occluded in the requested field-of-view. By streaming (at 314) the data for the tagged or retained primitives rather than all primitives in the requested field-of-view or in a tile, 3D streaming system 100 optimizes the streaming of the 3D content relative to voxel-based streaming techniques. Voxel-based streaming techniques include partitioning the 3D space of the 3D content or the 3D content into voxels or volumetric cells, and streaming the primitive data within the voxels that are in a requested field-of-view. Consequently, voxel-based streaming techniques stream more data with no gain in visual quality as the voxel-based streaming techniques stream the data for primitives that are occluded, not visible, and not rendered by the client device, whereas process 300 streams only the data for the primitives that are visible and are rendered by the client device.

The streaming of the retained primitive data within the tiles provides for a continuous, uninterrupted, and/or real-time experience as the field-of-view changes or in response to animated 3D content. As the field-of-view changes, 3D streaming system 100 streams the retained primitive data for new tiles that come into the requested field-of-view. In some embodiments, 3D streaming system 100 may define the tiles to partially overlap with neighboring tiles so as to provide a smooth visual transition when the field-of-view changes from a first set of tiles to a second set of tiles.

Figure 4:
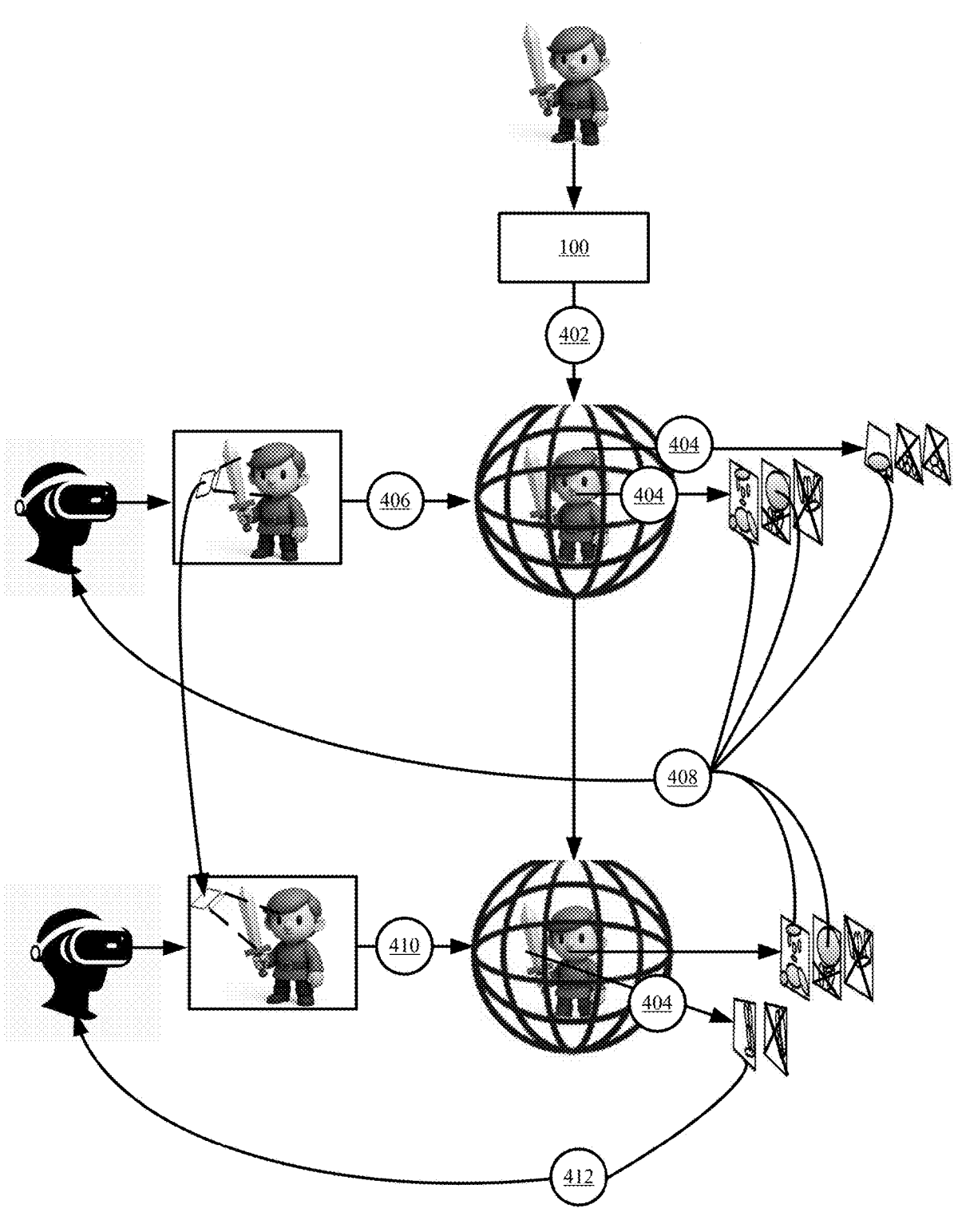
FIG. 4 illustrates an example of maintaining visual continuity when streaming different sets of tiles for different fields-of-view of 3D content in accordance with some embodiments presented herein.

FIG. 4 illustrates an example of maintaining visual continuity when streaming different sets of tiles for different fields-of-view of 3D content in accordance with some embodiments presented herein. 3D streaming system 100 segments (at 402) 3D content into tiles that partially overlap with neighboring tiles. In FIG. 4, 3D streaming system 100 segments (at 402) the 3D content into a spherical arrangement of tiles. In other words, the tiles encircle the 3D content. 3D streaming system 100 pre-processes and/or pre-renders the primitives in each tile to differentiate (at 404) the visible primitives from the non-visible primitives in each tile.

3D streaming system 100 receives (at 406) a request to present the 3D content from a first field-of-view. 3D streaming system 100 selects and streams (at 408) the retained primitives in a first set of tiles for the visual detail in the first field-of-view.

3D streaming system 100 receives (at 410) another request to present the 3D content from a second field-of-view. For instance, a user may provide an input to change the first field-of-view to the second field-of-view.

To ensure a smooth and continuous transition from the first field-of-view to the second field-of-view, 3D streaming system 100 selects and streams (at 412) the retained primitives in a second set of tiles with one or more tiles from the second set of tiles partially overlapping with one or more of the first set of tiles. In some embodiments, one or more of the second set of tiles may include some of the same retained primitives as one or more of the first set of tiles or may include one or more of the same tiles as the first set of tiles. In some such embodiments, 3D streaming system 100 may stream (at 412) some of the same primitives that were previously streamed so that the client device may align the retained primitives from neighboring tile when generating the updated visualization of the 3D content field-of-view. In some other embodiments, the tiles need not overlap as the retained primitives are defined with coordinates from the same 3D space. The client device receives the streamed data and renders a continuous 3D visualization that transitions smoothly between the 3D visualization created from rendering the retained primitives of the first set of tiles to the 3D visualization created from rendering the retained primitives of the second set of tiles. In some embodiments, the client device may add blurring, cross dissolve, or other effects to smooth the visual transition from one tile to the next or when changing the field-of-view causes new primitive data to be streamed and rendered with a rendered visualization of previously streamed primitive data.

3D streaming system 100 may vary the size and number of tiles when streaming 3D content at different levels-of-detail (LoDs). Each LoD encodes the 3D content with a different number of primitives and represents the 3D content with a different amount of visual detail or at a different fidelity. 3D streaming system 100 may define fewer tiles that are larger in size when the 3D content is to be presented with less detail, at a lower resolution, or from a large distance (e.g., a lower LoD) that causes some of the detail and/or resolution to be unnoticeable. Similarly, 3D streaming system 100 may define more tiles that are smaller in size when the 3D content is to presented with more detail, at a higher resolution, or from a closeup distance (e.g., a higher LoD) that reveals the smallest details.

3D streaming system 100 may define the different tile sizes and numbers of tiles in order to adjust the amount of primitive data within a tile to match an amount of data that may be streamed to a client device for a real-time 3D streaming experience. As the 3D content LoD decreases, the number of primitives that define the 3D content decreases as well. Accordingly, 3D streaming system 100 may define larger sized tiles to ensure that each tile has a minimum and/or maximum amount of primitive data that fits within the network performance envelope for the real-time streaming experience. The larger tiles simplify the selection of which tiles and their corresponding primitives fall within a requested field-of-view.

Figure 5:
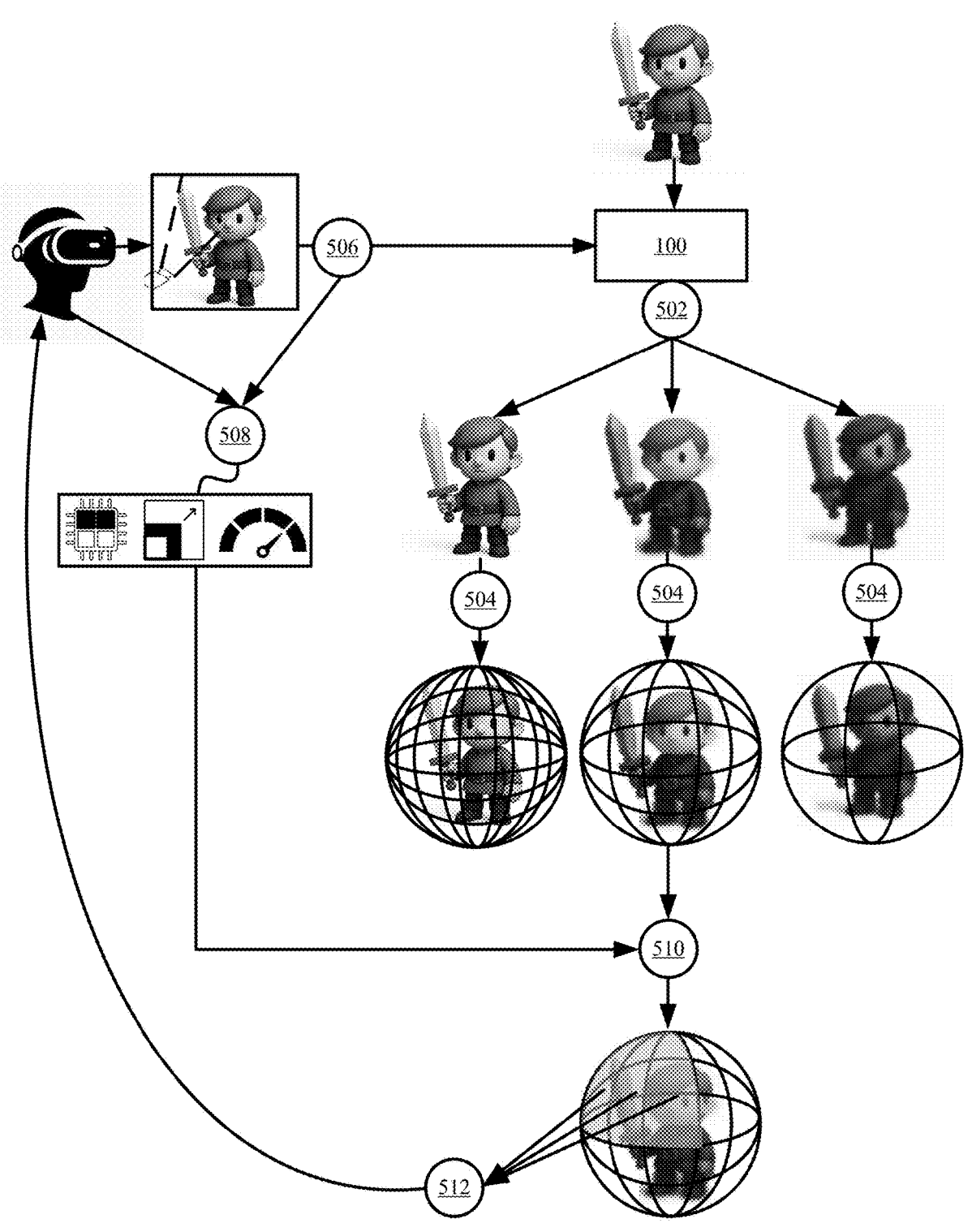
FIG. 5 illustrates an example of dynamically adjusting the tiles for streaming 3D content at different levels-of-detail (LoDs) in accordance with some embodiments presented herein.

FIG. 5 illustrates an example of dynamically adjusting the tiles for streaming 3D content at different LoDs in accordance with some embodiments presented herein. 3D streaming system 100 generates (at 502) or reencodes the 3D content at the different LoDs. For instance, 3D streaming system 100 receives the 3D content at a maximum resolution or LoD and downscales the 3D content to lower the resolutions and/or reduces the number of primitives that encode the 3D content at each of the lower LoDs.

3D streaming system 100 segments (at 504) each LoD encoding of the 3D content with different numbers of different sized tiles. In some embodiments, the segmentation (at 504) includes defining the tiles to encompass a maximum or minimum number of primitives such that a higher LoD encoding of the 3D content will contain more primitives in a smaller region than a lower LoD encoding of the 3D content. Each tile is pre-processed to identify and retain the primitives that are visible and/or not obscured from the viewpoint of the tile looking into the 3D content and to exclude or remove the primitives that are not visible and/or are obscured from the viewpoint of the tile looking into the 3D content.

3D streaming system 100 receives (at 506) a request to view the 3D content from a particular field-of-view. 3D streaming system 100 determines (at 508) supported resolutions of the requesting user device, rendering resources of the requesting user device, and/or network performance (e.g., bandwidth, latency, etc.) for the data network connecting the requesting user device to 3D streaming system 100. 3D streaming system 100 may determine (at 508) the supported resolutions and/or rendering resources by querying the requesting user device or based on header information included with the request. 3D streaming system 100 may determine (at 508) the network performance by exchanging test packets with the requesting user device or by tracking latency, bandwidth, and/or other network metrics when establishing a network connection and/or exchanging other data packets with the requesting user device.

3D streaming system 100 selects (at 510) the LoD encoding of the 3D content that is optimal for the determined (at 508) user device supported resolution, rendering resources, and/or network performance. In particular, 3D streaming system 100 selects (at 510) the LoD encoding that does not exceed the maximum supported resolution of the user device as the detail from any higher LoD encodings would simply not be visible on the lower resolution display of the user device and result in wasted rendering and network resources. 3D streaming system 100 may select (at 510) the LoD encoding that is lower than the maximum supported resolution but that may streamed at a desired frame rate to the user device based on the network performance not supporting streaming of the amount of data that is needed to provide a real-time streaming experience at the maximum supported resolution. For instance, if the LoD encoding of the 3D content is larger in size than the amount of data the data network can stream at the desired frame rate, then the user device will be continuously buffering and the user experience will be interrupted, jerky, or delayed.

In some embodiments, the selection (at 510) of the LoD encoding of the 3D content also accounts for the positioning (e.g., size or distance) of the 3D content in the requested field-of-view. If the 3D content is viewed closeup, then more of the details will be visible and 3D streaming system 100 will attempt to maximum the LoD in view of the user device supported resolution, rendering resources, and/or network performance. However, if the 3D content is presented at a small size in the distant background of the requested field-of-view, then much of the 3D content detail is not visible and network resources will be wasted streaming the 3D content at a higher LoD than is visible even if the higher LoD is supported by the user device, rendering resources, and/or network performance.

3D streaming system 100 streams (at 512) the retained or pre-culled primitives from the segmented tiles of the selected (at 510) LoD encoding that fill the requested field-of-view in response to the request. In this manner, 3D streaming system 100 dynamically tunes the amount of data that is streamed (at 512) to the user device so that the 3D content is presented without streaming extraneous data for primitives outside the field-of-view and that are not visible in the field-of-view such that the amount of detail that is visible is maximized to accommodate an interrupted real-time streaming experience at a desired frame rate given the available rendering performance and network performance.

The optimized streaming via the pre-culled segmentation may be adapted for animated or dynamic 3D content that changes over time. In particular, the pre-culled segmentation may be used to optimize the streaming of 3D animations, 3D videos, 3D games, and/or spatial computing experiences that involve the presentation of animated or dynamic 3D content.

FIG. 6 presents a process 600 for applying the pre-culled segmentation to optimize the streaming of changing 3D content in accordance with some embodiments presented herein. Process 600 is implemented by 3D streaming system 100 for changing 3D content that is to be streamed to different client devices over a data network.

In some embodiments, the changing 3D content corresponds to animated 3D content that is defined at a particular frame rate with various primitives of the animated 3D content changing from frame to frame. For instance, primitives may be removed, primitives may be added, or existing primitives may have their positions or visual characteristics (e.g., colors) adjusted from one frame to a next. The changing primitives may animate changes to the 3D shape, form, or visualization of various 3D objects or scene that form the changing 3D content. Additionally, the changing 3D content may change the field-of-view at which the 3D content is presented by zooming in, zooming out, rotating, or otherwise changing the position and angle at which the 3D content is viewed.

In some other embodiments, the changing 3D content corresponds to dynamic 3D content with primitives that change over time. However, the changes are not predefined and occur in response to conditional triggers, inputs, and/or other unknown actions. Moreover, the field-of-view at which to present the dynamic 3D content may not be predetermined and controlled in response to the conditional triggers, inputs, and/or other unknown actions.

Process 600 includes receiving (at 602) the changing 3D content at one or more LoDs. For instance, the changing 3D content may be encoded at different resolutions or defined using different numbers of primitives.

3D streaming system 100 segments (at 604) each frame or visualization of the changing 3D content at each LoD into multiple tiles. In some embodiments, the frames or visualizations of the changing 3D content encoded at a particular LoD may be segmented (at 604) to number of tiles associated with that particular LoD based on the resolution, number of primitives, and/or detail associated with the particular LoD. In some other embodiments, each frame or visualization of the changing 3D content encoded at a particular LoD may be segmented (at 604) to a custom number of tiles based on the resolution, number of primitives, and/or detail associated with that frame or visualization. 3D streaming system 100 segments (at 604) the frames or visualizations for each LoD simultaneously. In some embodiments, the first frame for the changing 3D content encoded at different LoDs may be segmented (at 604) to different numbers of tiles in parallel by pre-processing each LoD encoding using a different Graphics Processing Unit (GPU), GPU core, or programmable shader or compute unit of a GPU. For dynamic 3D content, 3D streaming system 100 segments (at 604) the current frame at the different LoDs as the current frame is generated. For animated or predefined 3D content, 3D streaming system 100 segments (at 604) all frames at the different LoDs prior to a user request to view or access the animated or predefined 3D content.

Process 600 includes filtering (at 606) the primitives in the segmented tiles for each frame or visualization. The filtering (at 606) includes retaining the primitives of a tile that are visible from the plane of that tile and culling primitives that are obscured or otherwise not visible from the plane of that tile, wherein the differentiation of the visible and non-visible primitives may include associating the plane of the tile as a field-of-view from which the tile primitives are rendered. In some embodiments, the retained primitives for tiles associated with different frames or visualizations of different LoD encodings may be tagged or linked to the respective frames or visualizations and/or LoD encoding so that the retained primitives for different frames or visualizations are readily accessible during streaming. 3D streaming system 100 may use different GPUs, GPU cores, or programmable shaders or compute units to filter the primitives for all tiles associated with a particular LoD encoding of the changing 3D content so that the filtering (at 606) may be performed in parallel for all LoD encodings.

Process 600 includes caching (at 608) the retained and/or visible primitives in the segmented tiles for each segmented frame or visualization. Each tile may be cached with a frame identifier and a positional or field-of-view identifier.

Process 600 includes receiving (at 610) a request for a particular frame of the changing 3D content. The request may be for a first frame or a client-specified frame of animated 3D content or for a current of dynamic 3D content that is being generated at 3D streaming system 100.

Process 600 includes determining (at 612) one or more of the requesting device's supported resolutions, requesting device rendering performance, and/or network performance for the network link connecting 3D streaming system 100 to the requesting device. 3D streaming system 100 may query the requesting device or monitor data packet exchanges in order to determine these and other metrics for providing the requesting device with a continuous real-time streaming experience that is not subject to buffering or other interruptions.

Process 600 includes determining (at 614) a different subset of tiles that contain the primitives for a current field-of-view of a current frame or visualization of the changing 3D content from each LoD encoding. Process 600 includes streaming (at 616) the retained primitives from the subset of tiles of a particular LoD encoding based on a total amount of primitive data in that subset of tiles allowing for a real-time streaming of the changing 3D content at a highest supported resolution in view of the determined (at 612) supported resolutions, rendering performance, and/or network performance. In other words, the total amount of primitive data in the subset of tiles from the selected LoD encoding streams the current frame or visualization of the changing 3D content at a maximum LoD that does not exceed the maximum supported resolution of the requesting device with the total amount of primitive data being within thresholds of the rendering performance and/or network performance for generating the real-time viewing experience of the changing 3D content. 3D streaming system 100 may switch between the subset of tiles of different LoD encodings when streaming different frames or visualizations of the changing 3D content. The amount of retained primitives may change from frame-to-frame such that the frames associated with a field-of-view defined by a greater number of retained primitives may be streamed with primitives encoded at a lower LoD and the frames associated with a field-of-view defined by a lower number of retained primitives may be streamed with primitives encoded at a higher LoD. 3D streaming system 100 attempts to maximize the resolution, quality, or LoD at which the changing 3D content is streamed using the pre-culled primitives while still ensuring that the retained primitive data for each frame or visualization is delivered and rendered at a desired frame rate associated with the real-time experience.

Figure 7:
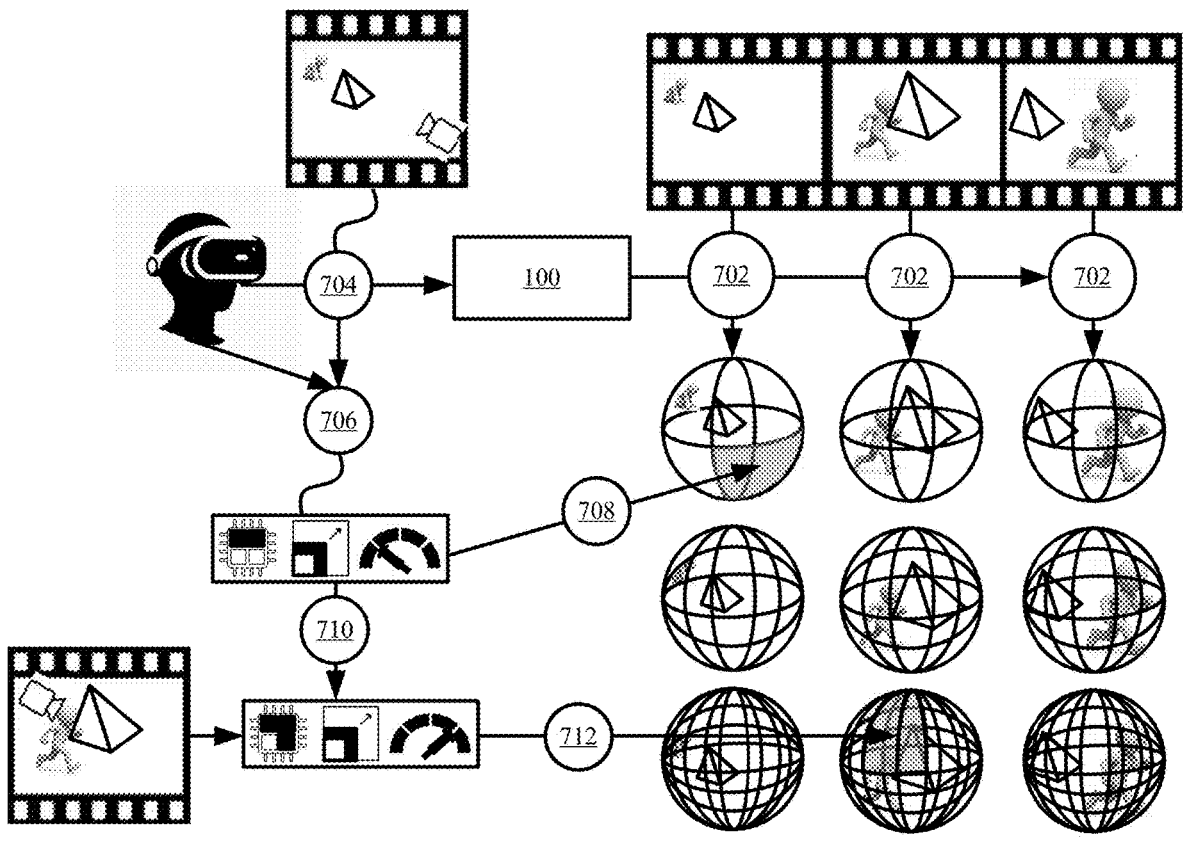
FIG. 7 illustrates transitioning between different optimized streams of animated 3D content in accordance with some embodiments presented herein.

FIG. 7 illustrates transitioning between different optimized streams of animated 3D content in accordance with some embodiments presented herein. 3D streaming system 100 generates (at 702) the pre-culled tiles for the animated 3D content at different LoDs.

3D streaming system 100 receives (at 704) a request to access or view the animated 3D content from a particular field. 3D streaming system 100 determines (at 706) the supported LoDs or resolutions of the requesting device, the rendering performance of the requesting device, and/or the network performance. 3D streaming system 100 streams (at 708) a first frame or first set of frames of the animated 3D content using the retained primitives of the animated 3D content at a first LoD based on the measured metrics for the supported LoD, rendering performance, and/or network performance.

The rendering and/or network performance may change (at 710) over time (e.g., increase or decrease) as the requesting device requests a next frame. Moreover, the position at which the animated 3D content is viewed may change over time (e.g., zoom in or zoom out). Based on the changes, 3D streaming system 100 streams (at 712) a second frame or second set of frames of the animated 3D content using the retained primitives of the animated 3D content at a second LoD. 3D streaming system 100 synchronizes the pre-processed frames of the animated 3D content at the different LoDs to allow for the seamless transitioning between streaming the retained primitives at the different LoDs.

The pre-processed frames of the animated 3D content at the different LoDs are stored in local memory or local storage of 3D streaming system 100 or are generated in real-time for dynamic 3D content as the frames at the different LoDs are generated. As such, 3D streaming system 100 may store multiple different versions of the same 3D content. However, each stored version contains less data and fewer primitives than the original unculled instance of the 3D content because each stored version stores only the visible primitives in the segmented tiles and excludes or culls the non-visible primitives.

In some embodiments, 3D streaming system 100 performs a tiered segmentation of the 3D content for faster processing of the 3D content and selection of the relevant tiles for a requested field-of-view. 3D streaming system 100 may perform the tiered segmentation in response to the size or the amount of primitives encoded as part of the 3D content exceeding one or more thresholds. The tiered segmentation may include partitioning or segmenting the 3D content into two or more chunks that each contain a different subset of the 3D content primitives. 3D streaming system 100 divides the 3D content into chunks so that the primitives associated with a single chunk are able to be loaded into memory when the 3D content has too many total primitives to load into memory at one time. Accordingly, 3D streaming system 100 loads the primitives of one chunk into memory, segments that chunk into tiles, and pre-processes the primitives in each tile to differentiate the visible primitives from the non-visible primitives. 3D streaming system 100 may then load the primitives of a next chunk into memory, segment the newly loaded into tiles, and pre-preprocess those primitives.

The tiered segmentation allows 3D streaming system 100 to reduce the amount of memory that is needed to pre-process the 3D content and/or to determine the retained primitives of which tiles to stream to a requesting user device by avoiding having to load the entire 3D content into memory. For instance, 3D streaming system 100 may receive a request from a user device to present the 3D content from a particular field-of-view. 3D streaming system 100 may determine that the particular field-of-view falls within a first chunk of a first tiered segmentation of the 3D content and may analyze the tiles within the first chunk to determine which primitives to stream without loading or analyzing the tiles in other chunks from the first tiered segmentation of the 3D content.

The tiered segmentation may also be used to stream the 3D content at different depths. For instance, 3D streaming system 100 may define a first chunk to include all primitives forming outer surfaces or an exterior of the 3D content, and may define a second chunk to include primitives at one or more layers forming inner surfaces or an interior of the 3D content. Accordingly, if the virtual camera establishes an exterior view of the 3D content, then 3D streaming system 100 may retrieve and analyze the tiles associated with the first chunk. If the virtual camera establishes an interior view of the 3D content by moving into an interior of the 3D content, then 3D streaming system 100 may retrieve and analyze the tiles associated with the second chunk.

Figure 8:
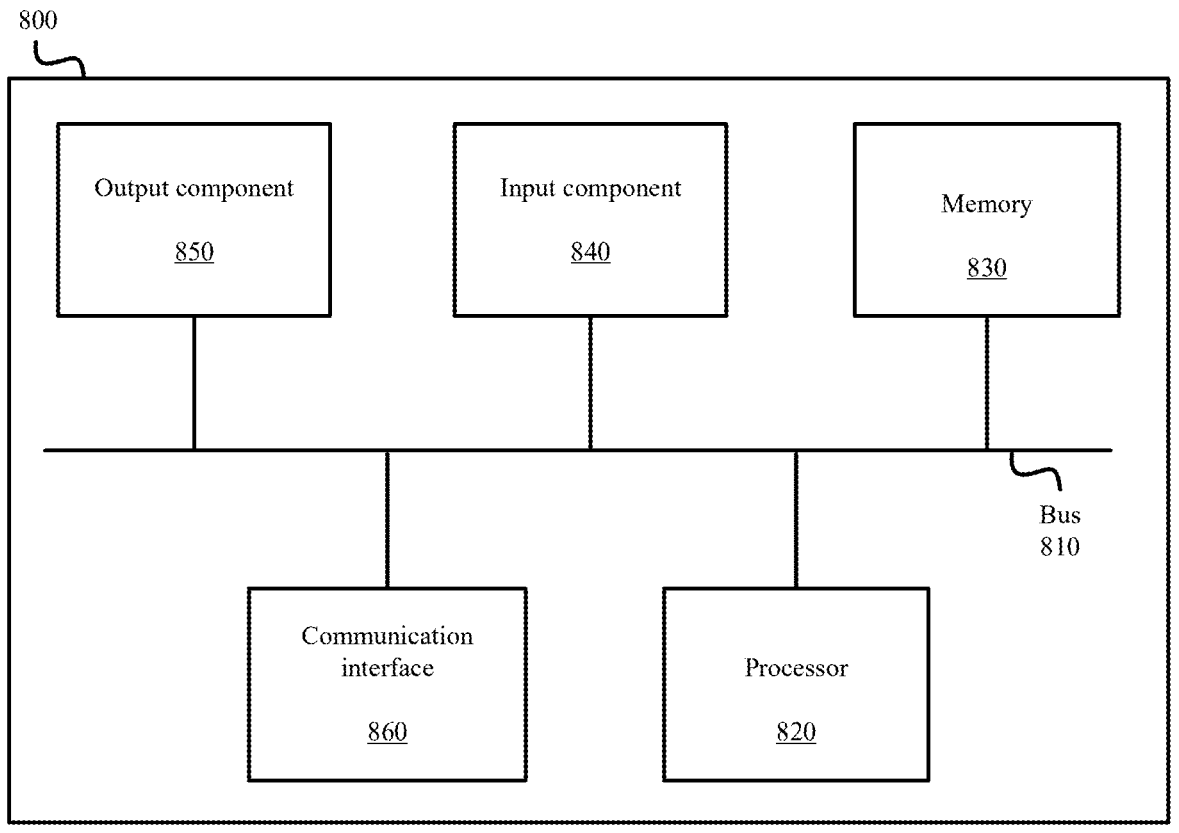
FIG. 8 illustrates example components of one or more devices, according to one or more embodiments described herein.

FIG. 8 is a diagram of example components of device 800. Device 800 may be used to implement one or more of the tools, devices, or systems described above (e.g., 3D streaming system 100, client device, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving three-dimensional (3D) content comprising a plurality of primitives defined in a 3D space;

defining a set of tiles comprising two-dimensional (2D) planes in the 3D space that surround the 3D content from different sides and that are a specified distance away from the plurality of primitives;

segmenting a different set of primitives from the plurality of primitives to a different tile of the set of tiles based on the different set of primitives being positioned within boundaries of the 2D plane of the different tile;

filtering the different set of primitives segmented to each tile of the set of tiles, wherein filtering the different set of primitives that are segmented to a particular tile of the set of tiles comprises differentiating a first subset of primitives from the different set of primitives that are visible through the 2D plane of the particular tile from a second subset of primitives from the different set of primitives that are not visible through the 2D plane of the particular tile;

receiving a request to view the 3D content from a particular field-of-view;

retrieving one or more tiles from the set of tiles that span the particular field-of-view; and streaming the first subset of primitives that are visible from each tile of the one or more tiles in response to the request without the second subset of primitives that are not visible from each tile of the one or more tiles.

2. The method of claim 1, wherein differentiating the first subset of primitives from the second subset of primitives comprises:

rendering the different set of primitives that are segmented to the particular tile from a field-of-view that spans the 2D plane of the particular tile; and identifying the first subset of primitives with contributions to a visualization generated from rendering the different set of primitives.

3. The method of claim 1, wherein differentiating the first subset of primitives from the second subset of primitives comprises:

determining that the first subset of primitives have positions in the 3D space that are closer to the 2D plane of the particular tile than positions of the second subset of primitives in the 3D space and that the first subset of primitives occlude the second subset of primitives from being visible from the 2D plane of the particular tile.

4. The method of claim 1, wherein retrieving the one or more tiles comprises:

determining that at least one primitive from the different set of primitives segmented to a tile of the one or more tiles has a position within the particular field-of-view.

5. The method of claim 1, wherein the plurality of primitives correspond to one of a plurality of splats, a plurality of meshes, or a plurality of points that are defined with positions and visual characteristics in the 3D space.

6. The method of claim 1, wherein each tile of the set of tiles corresponds to a 2D plane about a sphere that surrounds the plurality of primitives.

7. The method of claim 1 further comprising:

encoding the 3D content at each of a different plurality of levels-of-detail (LoDs) using a different plurality of primitives;

segmenting the different plurality of primitives associated with each LoD of the plurality of LoDs;

determining one or more of a rendering performance of a device issuing the request or a network performance of a data network across which the request is sent; and selecting the first subset of primitives that are visible from each tile of the one or more tiles of the 3D content at a particular LoD of the plurality of LoDs for said streaming in response to a total amount of data associated with the first subset of primitives that are visible from each tile of the one or more tiles of the 3D content at the particular LoD being within a maximum amount of data supported by the rendering performance or the network performance for a real-time viewing of the 3D content at a desired frame rate.

8. The method of claim 1, wherein filtering the different set of primitives segmented to each tile of the set of tiles further comprises:

retaining the first subset of primitives within each tile of the set of tiles; and culling the second subset of primitives from each tile of the set of tiles.

9. The method of claim 1, wherein filtering the different set of primitives segmented to each tile of the set of tiles further comprises:

tagging the first subset of primitives within each tile of the set of tiles as visible primitives to stream to a requesting device.

10. A streaming system comprising:

one or more hardware processors configured to:

receive three-dimensional (3D) content comprising a plurality of primitives defined in a 3D space;

define a set of tiles comprising two-dimensional (2D) planes in the 3D space that surround the 3D content from different sides and that are a specified distance away from the plurality of primitives;

segment a different set of primitives from the plurality of primitives to a different tile of the set of tiles based on the different set of primitives being positioned within boundaries of the 2D plane of the different tile;

filter the different set of primitives segmented to each tile of the set of tiles, wherein filtering the different set of primitives that are segmented to a particular tile of the set of tiles comprises differentiating a first subset of primitives from the different set of primitives that are visible through the 2D plane of the particular tile from a second subset of primitives from the different set of primitives that are not visible through the 2D plane of the particular tile;

receive a request to view the 3D content from a particular field-of-view;

retrieve one or more tiles from the set of tiles that span the particular field-of-view; and stream the first subset of primitives that are visible from each tile of the one or more tiles in response to the request without the second subset of primitives that are not visible from each tile of the one or more tiles.

11. The streaming system of claim 10, wherein differentiating the first subset of primitives from the second subset of primitives comprises:

rendering the different set of primitives that are segmented to the particular tile from a field-of-view that spans the 2D plane of the particular tile; and identifying the first subset of primitives with contributions to a visualization generated from rendering the different set of primitives.

12. The streaming system of claim 10, wherein differentiating the first subset of primitives from the second subset of primitives comprises:

determining that the first subset of primitives have positions in the 3D space that are closer to the 2D plane of the particular tile than positions of the second subset of primitives in the 3D space and that the first subset of primitives occlude the second subset of primitives from being visible from the 2D plane of the particular tile.

13. The streaming system of claim 10, wherein retrieving the one or more tiles comprises:

determining that at least one primitives from the different set of primitives segmented to a tile of the one or more tiles has a position within the particular field-of-view.

14. The streaming system of claim 10, wherein the plurality of primitives correspond to one of a plurality of splats, a plurality of meshes, or a plurality of points that are defined with positions and visual characteristics in the 3D space.

15. The streaming system of claim 10, wherein each tile of the set of tiles corresponds to a 2D plane about a sphere that surrounds the plurality of primitives.

16. The streaming system of claim 10, wherein the one or more hardware processors are further configured to:

encode the 3D content at each of a different plurality of levels-of-detail (LoDs) using a different plurality of primitives;

segment the different plurality of primitives associated with each LoD of the plurality of LoDs;

determine one or more of a rendering performance of a device issuing the request or a network performance of a data network across which the request is sent; and select the first subset of primitives that are visible from each tile of the one or more tiles of the 3D content at a particular LoD of the plurality of LoDs for said streaming in response to a total amount of data associated with the first subset of primitives that are visible from each tile of the one or more tiles of the 3D content at the particular LoD being within a maximum amount of data supported by the rendering performance or the network performance for a real-time viewing of the 3D content at a desired frame rate.

17. The streaming system of claim 10, wherein filtering the different set of primitives segmented to each tile of the set of tiles further comprises:

retaining the first subset of primitives within each tile of the set of tiles; and culling the second subset of primitives from each tile of the set of tiles.

18. A non-transitory computer-readable medium storing instructions that, when executed by one or more processors of a streaming system, cause the streaming system to perform operations comprising:

receiving three-dimensional (3D) content comprising a plurality of primitives defined in a 3D space;

defining a set of tiles comprising two-dimensional (2D) planes in the 3D space that surround the 3D content from different sides and that are a specified distance away from the plurality of primitives;

segmenting a different set of primitives from the plurality of primitives to a different tile of the set of tiles based on the different set of primitives being positioned within boundaries of the 2D plane of the different tile;

filtering the different set of primitives segmented to each tile of the set of tiles, wherein filtering the different set of primitives that are segmented to a particular tile of the set of tiles comprises differentiating a first subset of primitives from the different set of primitives that are visible through the 2D plane of the particular tile from a second subset of primitives from the different set of primitives that are not visible through the 2D plane of the particular tile;

receiving a request to view the 3D content from a particular field-of-view;

retrieving one or more tiles from the set of tiles that span the particular field-of-view; and streaming the first subset of primitives that are visible from each tile of the one or more tiles in response to the request without the second subset of primitives that are not visible from each tile of the one or more tiles.

* * * * *